United States Patent [19]

Cok et al.

[11] Patent Number: 4,903,986
[45] Date of Patent: Feb. 27, 1990

[54] MODULAR OCCUPANT RESTRAINT SYSTEM

[75] Inventors: David A. Cok, Birmingham, Mich.; Robert L. Jones, Centerville, Ohio; Jeffery L. Pearson, Grosse Pointe Farms, Mich.

[73] Assignee: General Motors Corporation, Detroit, Mich.

[21] Appl. No.: 270,609

[22] Filed: Nov. 14, 1988

[51] Int. Cl.$^4$ ............................................. B60R 21/20
[52] U.S. Cl. ..................................... 280/743; 280/731
[58] Field of Search ............... 280/731, 732, 733, 728, 280/743, 727

[56] References Cited

U.S. PATENT DOCUMENTS

| | | | |
|---|---|---|---|
| 3,819,205 | 6/1974 | Dunford et al. | 280/731 |
| 4,101,146 | 7/1978 | Oehm | 280/743 |
| 4,111,457 | 9/1978 | Kob et al. | 280/743 |
| 4,148,503 | 4/1979 | Shiratori et al. | 280/731 |
| 4,235,453 | 11/1980 | Lawson et al. | 280/743 |
| 4,286,954 | 9/1981 | McArthur et al. | 493/244 |
| 4,325,568 | 4/1982 | Clark et al. | 280/731 |
| 4,334,699 | 6/1982 | Patzelt et al. | 280/731 |

Primary Examiner—Richard A. Bertsch
Attorney, Agent, or Firm—Herbert Furman

[57] ABSTRACT

A modular occupant restraint system includes a container for the folded cushion and a cover for the container. The container has lines of perforations which subdivide the walls thereof into two sets of flaps. One set of flaps permits deployment of the folded cushion along alternate paths laterally of the system and generally parallel to the driver's torso. The other set of flaps permits deployment of the cushion along the intended path toward the driver's torso. The cover has weakened lines which subdivide the cover into flaps generally coextensive with those of the container. The folded cushion has fan folded chordal portions which are located opposite the first set of flaps of the container to forcibly open such flaps.

9 Claims, 7 Drawing Sheets

MODULAR OCCUPANT RESTRAINT SYSTEM

This invention relates generally to modular occupant restraint systems for vehicle drivers and more particularly to an improved modular occupant restraint system which permits initial deployment of the cushion along alternate paths laterally of the module and generally parallel to the driver should the cushion be unable to deploy along a normal path forwardly of the module and toward the driver.

Modular occupant restraint systems for vehicle drivers are known. U.S. Pat. Nos. 3,819,205, Dunford et al, Modular Occupant Restraint System, and 4,25,568 Clark et al, Modular Occupant Restraint System, both show such a system which generally includes an inflator, an inflatable cushion, a box-like rectangular shaped container for the cushion, a cover for the container, and a support plate for mounting the inflator, cushion, container and cover to provide the module. The module is mounted on the vehicle steering wheel and has the longer sides thereof, generally called the 6 and 12 o'clock sides, positioned transversely of the driver's torso and the shorter sides thereof, generally called the 3 and 9 o'clock sides, positioned longitudinally of the driver's torso.

The system of this invention is of the modular type but includes an improved container and cover and an improved cushion fold which permit initial deployment of the cushion along alternate paths should the cushion be prevented from deployment along its normal intended path.

In the preferred embodiments of the invention, the container for the folded cushion has its side walls and its base wall provided with perforated lines to provide two sets of flaps. One set of flaps permits deployment of the cushion along a normal or intended path toward the driver's torso through the base wall of the container. The other set of flaps permits initial deployment of the cushion along alternate paths laterally of the module and generally parallel to the driver's torso through the longer or 6 and 12 o'clock sides of the container should the cushion be unable to deploy along its normal or intended path. The lines of perforations differ from each other to provide the different embodiments of the invention. The cover is provided with weakened or score lines which overlie and generally match the perforated lines of the container so that the cover will subdivide into flaps which are generally coextensive with the container flaps when the cushion is deployed.

The cushion is comprised of juxtaposed forward and rearward circular members which are secured to each other along their circular edge portions. The forward cushion member provides an impact surface for the driver when the cushion is deployed. When the cushion is folded, the forward and rearward cushion members have overlying planar diametrical portions. The chordal portions of the cushion members to each side of the diametrical portions are fan folded and located within the diametrical portions. The end portions of the diametrical portions and fan folded chordal portions are pleated to provide a folded cushion of minimum size which fits within the container, with the fan folded chordal portions being located opposite the longer or 6 and 12 o'clock side walls of the container, and the pleat folded end portions of the cushion being located opposite the shorter or 3 and 9 o'clock side walls of the container. The rearward cushion member has an inlet for the inflator.

The primary feature of this invention is that it provides an improved modular occupant restraint system which permits initial deployment of the cushion along alternate paths laterally of the module and generally parallel to the torso of the driver should the cushion be unable to deploy along its intended path, forwardly of the module toward the driver's torso. Another feature is that the container for the folded cushion and the cover for the container can be subdivided into two sets of flaps, one set of flaps permitting the lateral and parallel deployment of the cushion, and the other set of flaps permitting normal deployment of the cushion toward the driver's torso. A further feature is that the container has lines of perforations which divide the container into the two sets of flaps, and the cover has lines of weakness which divide the cover into flaps which are generally coextensive with those of the container. Yet another feature is that the container is of generally rectangularly shaped box like shape, with the one set of flaps being generally located in the longer or 6 and 12 o'clock side walls of the container. Yet a further feature is that the cushion is comprised of overlying or juxtaposed cushion members which are folded to provide fan folded chordal portions located inwardly of and opposite the longer or 6 and 12 o'clock side walls of the container. Still another feature is that the cushion members have overlying or juxtaposed generally planar diametrical portions and that the fan folded chordal portions are located within the diametrical portions when the cushion is folded.

These and other features of the invention will be apparent from the following specification and drawing wherein.

Figure 1:
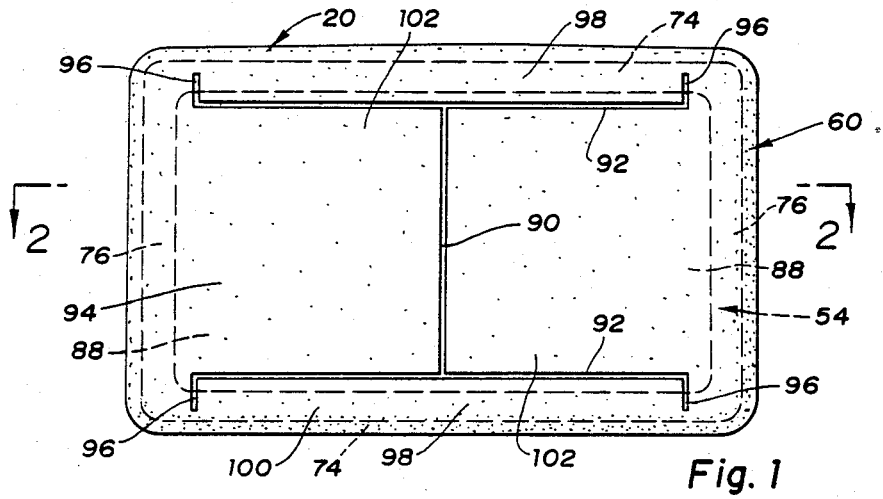
FIG. 1 is a top plan view of a module according to this invention.
Figure 2:
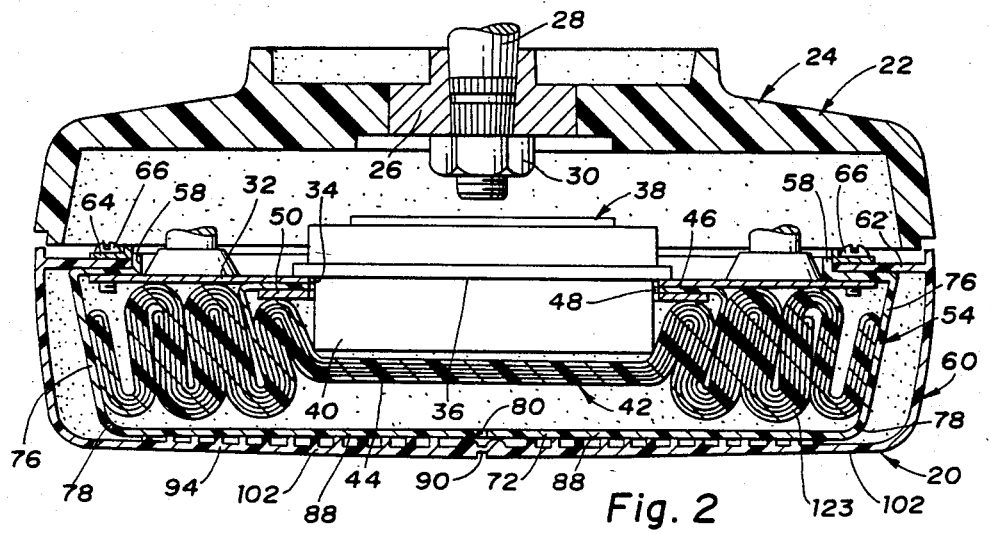
FIG. 2 is an enlarged sectional view taken along line 2—2 of FIG. 1.
Figure 3:
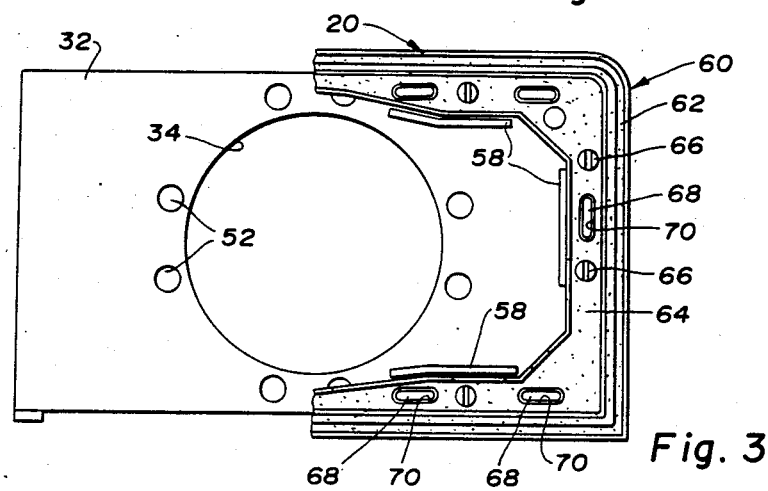
FIG. 3 is a partial bottom plan view.

Referring now to FIGS. 1 through 3 of the drawings, a modular occupant restraint system 20 is shown mounted in a conventional manner to the hub portion 22 of a vehicle steering wheel 24. The hub portion includes a splined bushing 26 which receives the upper splined end of the vehicle steering shaft 28 and is bolted thereto at 30 to secure the steering wheel to the vehicle steering system.

A generally rectangularly shaped support or plate 32 has a central circular opening 34. The flange 36 of a conventional inflator 38 seats against the lower side of the plate 32 and is secured thereto in a conventional manner. The upper outlet portion 40 of the inflator projects through the plate 32 and into the interior of a folded inflatable driver restraint cushion 42 of conventional construction. The cushion 42 includes upper and lower or forward and rearward circular members 44 and 46 which are secured together at their circular edge portions. The upper or forward cushion member 44 provides the impact surface of the cushion for the driver when the cushion is inflated, and the lower or rearward cushion member 46 has a central opening 48 which receives the upper outlet portion 40 of the gas generator therethrough. A ring 50 is fastened at 52 to the plate 32 around the opening 34 therein to clamp the cushion member 46 to the plate 32 around the opening 48 therethrough. The manner of folding the cushion 42 will be further described.

The inflator 38 is a gas generator which is electrically actuated from a conventional electrical power source when acceleration or velocity or other type sensors sense the impact of the vehicle with an obstacle or the possibility or probability of such an impact. Such sensors and the circuits connecting the sensors to a power source are well known in the art. Likewise, inflators of the gas generating type are also well known in the art.

A container 54 for the cushion 42 is formed of generally rigid plastic material and has a generally box-like rectangular shape. The container 54 houses the folded cushion 42 and has a flange 56 which underlies the plate 32 and has lateral flange segments 58 therealong, FIGS. 2 and 3. An outer decorative cover 60 of flexible plastic material is of the same general shape as the container 54. The cover 60 has a flange 62 which overlies the flange 56 of the container. A retainer 64 overlies the flange 62 and is fastened at 66 to the support plate 32 to secure the container and cover to the support plate. The flange 62 of the cover has lateral nubs or projections 68 which are received in openings 70 of the retainer 64. The plate 32 thus mounts the inflator 38, the cushion 42, the container 54, and the cover 60 to provide the modular restraint system 20.

Figure 4:
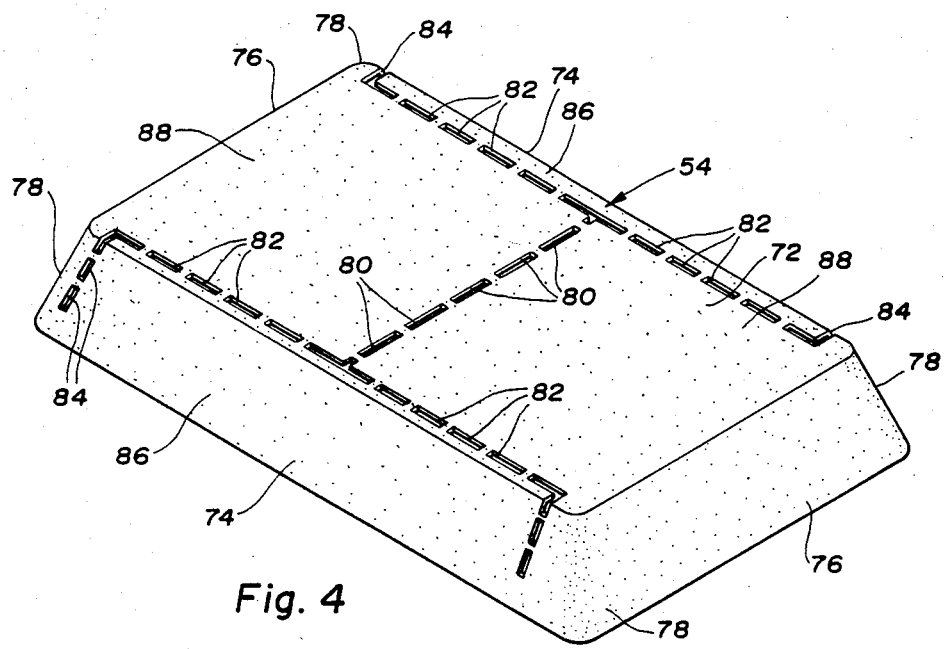
FIG. 4 is a perspective view of a container according to one embodiment of this invention.
Figure 5:
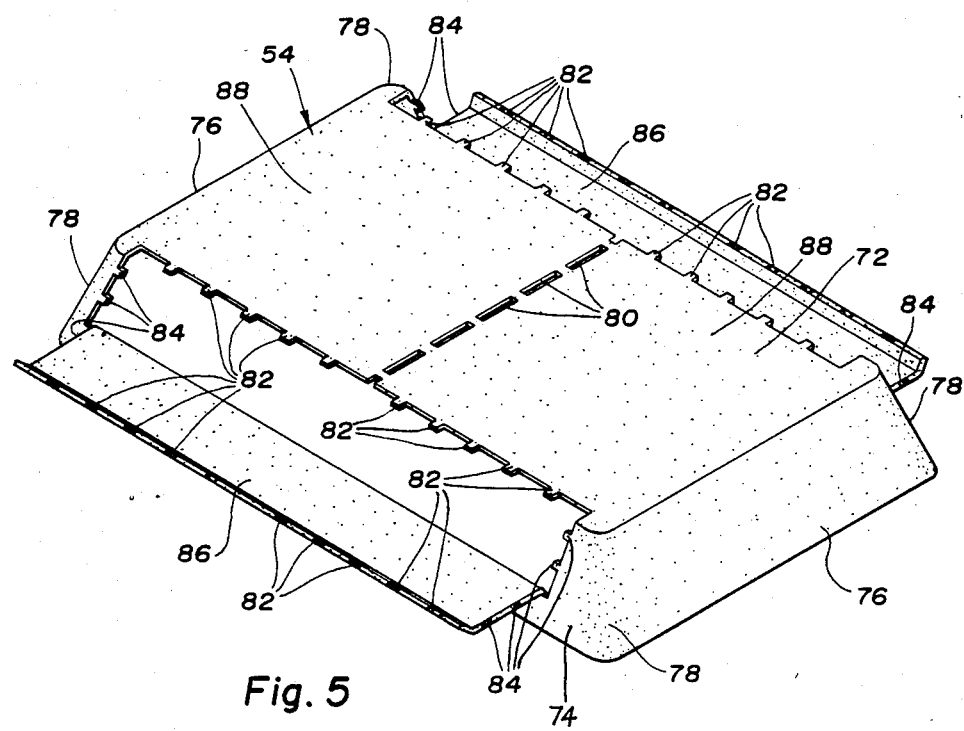
FIG. 5 is a view of the container of FIG. 4 with the one set of flaps opened to permit initial deployment of the cushion, not shown, along alternate paths parallel to the driver's torso.
Figure 6:
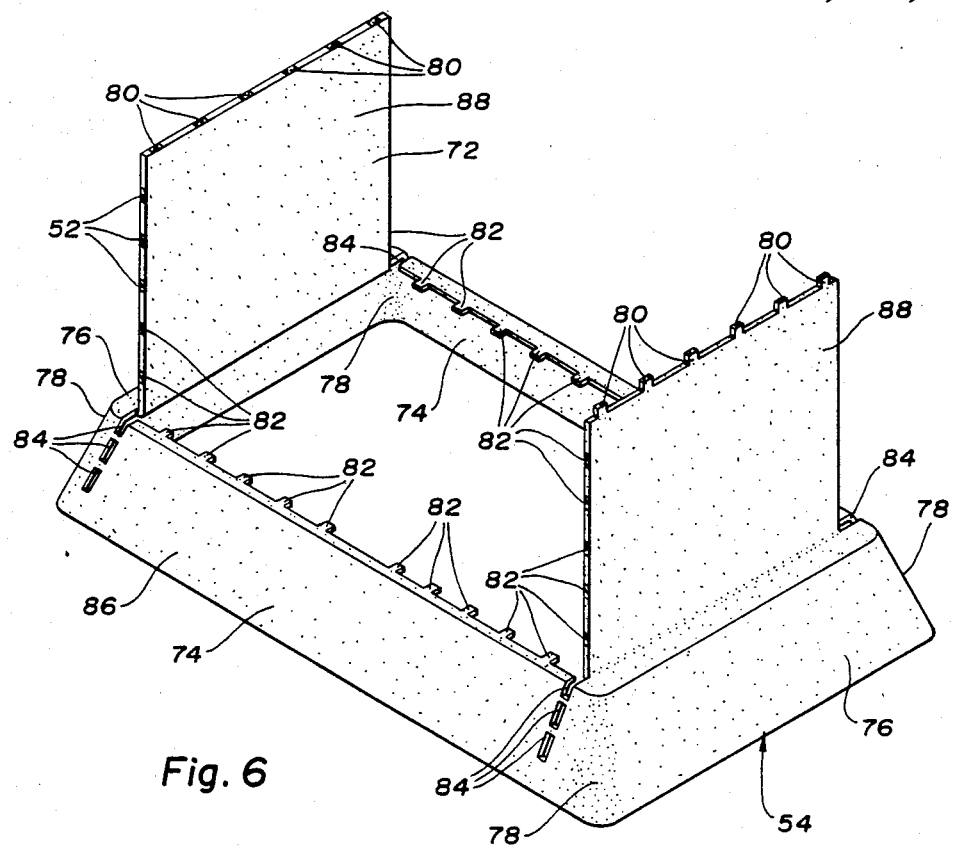
FIG. 6 is a view of the container of FIG. 4 with the other set of flaps opened to permit deployment of the cushion, not shown, along the normal or intended path toward the driver's torso.

Referring now to FIGS. 4 through 6, one embodiment of the invention will be described. The container 54 has a generally planar forward or base wall 72 which is integral with a pair of longer side walls 74 and a pair of shorter side walls 76, with the pairs of side walls being integrally joined to each other at corners 78. As can be seen, the side walls 74 and 76 and the corners 78 are slightly angular to the base wall 72. It will be understood that the system 20 is mounted to the steering wheel 24 with the base wall 72 facing the driver's torso, the side walls 74 located transversely of the driver's torso, and the side walls 76 located longitudinally of the driver's torso. Thus, the side walls 74 are alternately referred to as the 6 and 12 o'clock side walls and the side walls 76 are alternately referred to as the 3 and 9 o'clock side walls.

The base wall 72 is provided with a line of perforations 80 extending transversely thereof between the side walls 74, and lines of perforations 82 which cross the line 80 in H shaped fashion and are located adjacent the longer side edge portions of wall 72 and the juncture edge portions of walls 74. Lines of perforations 82 terminate short of the shorter side edge portions of wall 72 and the juncture edge portions of walls 76. Lines of perforations 84 extend transversely to the ends of lines 82 partially transversely of the side walls 74, terminating short of the lower or rearward side edge portions thereof. The lines of perforations 82 and 84 define a first pair of downwardly opening integrally hinged flaps 86, the major portions of which are located in the side walls 74. The hinge line or hinge axis of each flap 86 extends between the free ends of a respective pair of lines of perforations 84. The lines of perforations 80 and 82 define a second pair of oppositely outwardly opening integrally hinged flaps 88, the hinge line or hinge axis of each flap extending between the free ends of a respective pair of lines of perforations 82. The perforations of the lines 80, 82, and 84 are molded in when the container 54 is molded of semi-rigid plastic material.

As can be seen from FIG. 1, the cover 60 has molded in lines 90 and 92 in its forward or base wall 94, and molded in lines 96 in its longer or 6 and 12 o'clock side walls 98 which overlie and are generally coextensive with walls 74 of container 54. The molded in lines 90, 92, and 96 are respectively aligned with the lines of perforations 80, 82, and 84 of container 54. The lines 92 and 96 define a first pair of integrally hinged flaps 100 in wall 98, these flaps being respective to and generally coextensive with the underlying flaps 86 of container 54. The lines 90 and 92 define a second pair of integrally hinged flaps 102 in wall 94, these flaps being respective to and generally coextensive with the underlying flaps 88 of the container 54. The hinge lines or hinge axes of flaps 100 and 102 are generally aligned with those of their respective flaps 86 and 88 of container 54. The cover 60 is not shown in FIGS. 4 through 6 for clarity of illustration.

Figure 13:
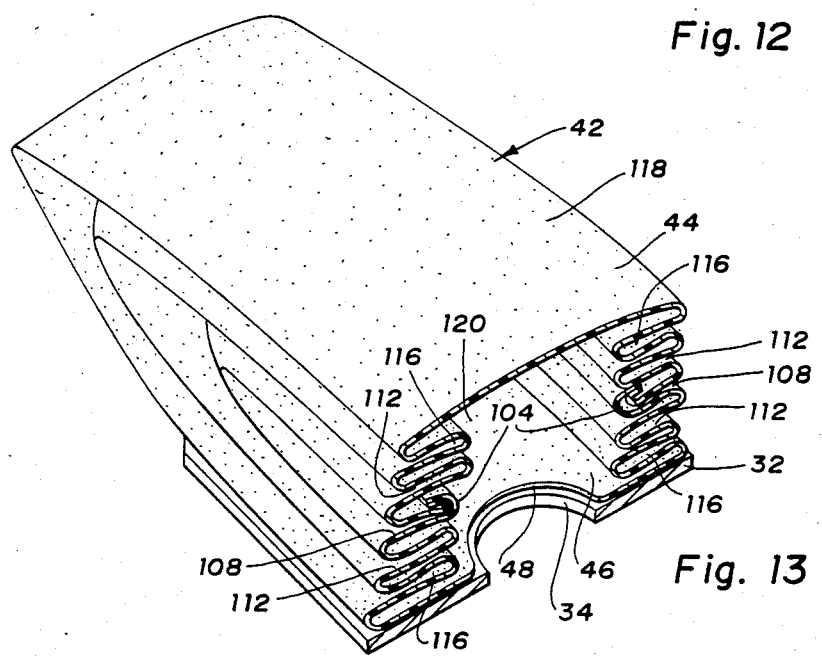
FIG. 13 is a partially cut away perspective view of a partially inflated cushion folded according to this invention.
Figure 14:
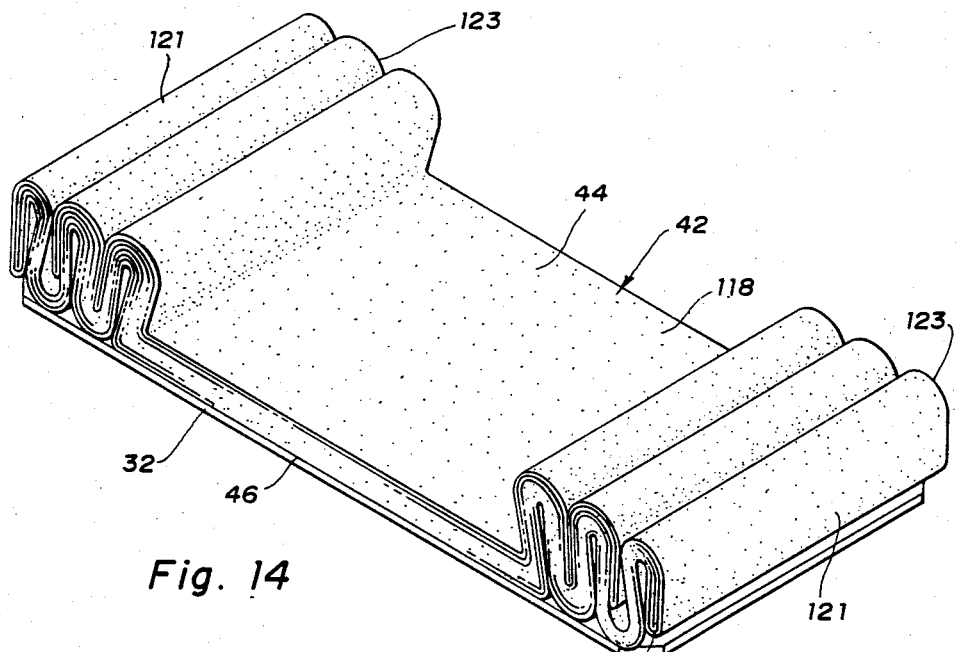
FIG. 14 is a perspective view of a cushion folded and pleated according to this invention.
Figure 15A:
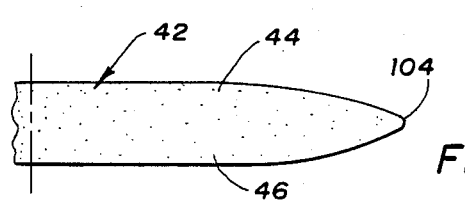
FIGS. 15A through 15D are schematic views of the cushion fold.
Figure 15B:
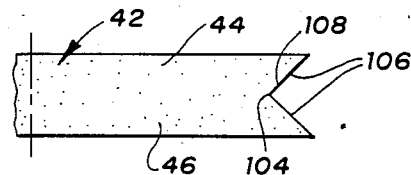
Figure 15C:
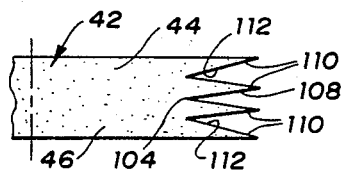
Figure 15D:
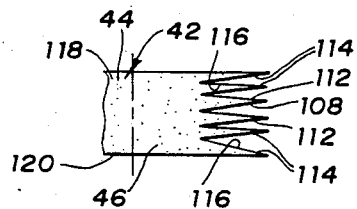

Referring now to FIGS. 13 through 15D, the cushion 42 will be described. The cushion 42 is of conventional construction and includes the circular cushion members 44 and 46 which are secured together along their circular edge portions 104, FIG. 13 and FIGS. 15A through 15D. One method of folding the cushion is shown in FIGS. 15A through 15D. The cushion members 44 and 46 are located in a planar position or laid flat with respect to each other, as shown schematically in FIG. 15A. Then, as shown schematically in FIG. 15B, diametrically opposite chordal portions 106 of the cushion members 44 and 46 are fan folded to provide the initial fan fold 108. As shown schematically in FIG. 15C, the next succeeding diametrically opposite chordal portions 110, those immediately adjacent to the fan fold 108, of the cushion members 44 and 46 are then fan folded to provide the pair of fan folds 112, each located on a respective side of the fan fold 108. Then, as shown in FIG. 15D, the next succeeding diametrically opposite chordal portions 114, those immediately adjacent to the fan folds 112, are fan folded to provide the pair of fan folds 116. The fan folds 108, 112, and 116 are located within the remaining diametrical portions 118 and 120 of the cushion members 44 and 46 as shown in FIG. 13. The end portions 121 of the fan folds 108, 112, and 116 and of the diametrical portions 118 and 120 are then pleat folded at 123, FIG. 14, to provide a fully folded cushion 42. This folded cushion is housed within the container 54 with the fan folds 108, 112, and 116 of the cushion being located opposite the side walls 74 of the container and the pleat folded end portions of the cushion being located opposite the side walls 76 of the container, as shown in FIG. 2.

When the inflator 38 receives an appropriate electrical signal, the inflator generates gas which exits from the outlet portion 40 of the inflator, FIG. 2, into the folded cushion 42 through the opening 48 in the cushion member 46 to initiate inflation or deployment of the cushion. During normal deployment, the diametrical portion 118 of the inflating cushion 42 forcefully engages the base wall 72 of the container as the cushion 42 is initially inflated. This separates wall 72 along the lines of perforations 80 and 82 into the oppositely outwardly opening integrally hinged flaps 88, as shown in FIG. 6, and simultaneously separates the wall 94 into the generally coextensive integrally hinged oppositely outwardly opening flaps 102 so that the cushion 42 can deploy forwardly along its normal or intended path toward the driver's torso as the fan folds 108, 112 and 116 unfold into continuations of the cushion members 44 and 46. The cushion 42 is not shown in FIG. 6 for clarity of illustration.

Should the cushion 42 be unable to deploy along its normal or intended path, during initial deployment, such as by wall 94 being obstructed so that it and wall 72 cannot be separated into the flaps 102 and 88 by the force of the diametrical portion 118 against wall 72, the fan folds 108, 112, and 116 will start to unfold and exert pressure against the side walls 74 of the container The force of the unfolding fan folds against walls 74 will separate these walls along the lines of perforations 82 and 84 into the downwardly or rearwardly opening integrally hinged flaps 86. The cover 60 will generally likewise separate along the lines 92 and 96 into the downwardly or rearwardly opening flaps 102 which open generally simultaneously with their respective flaps 86. This permits the fan folds 108, 112, and 116 of the cushion 42 to unfold outwardly through the resultant openings, along alternate paths generally laterally of the system 20 or parallel to the driver's torso. The force at which walls 74 separate into flaps 86 is determined by the material of the container, the thickness of the walls 74, and the extent and spacing of the perforations of the lines 82 and 84. Likewise, the depth of lines 92 and 96 and the material of the cover are selected so that the flaps 100 open generally simultaneously with the flaps 86.

Figure 7:
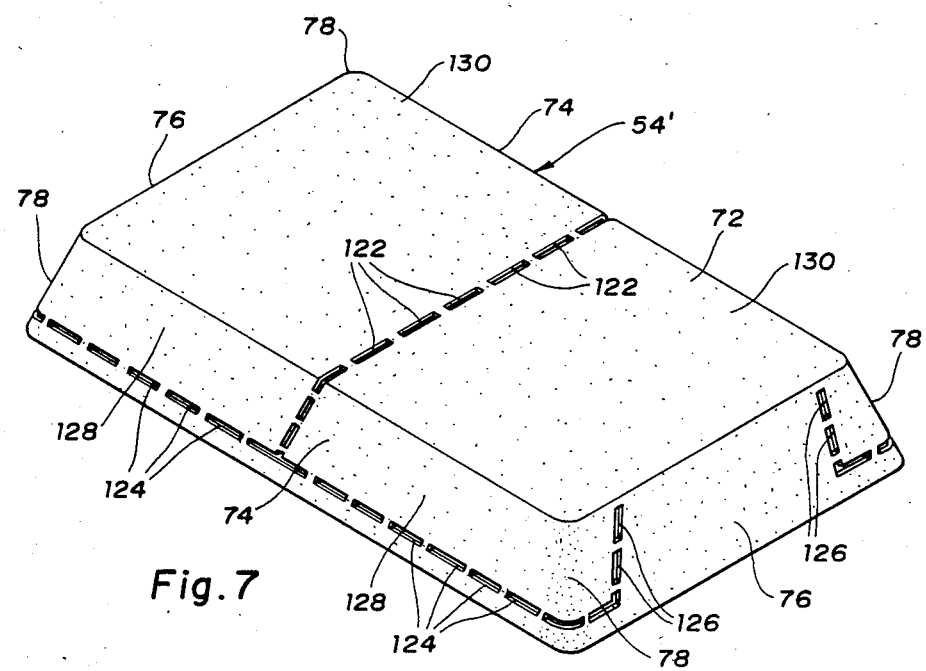
FIG. 7 is a perspective view of a container according to a second embodiment of this invention.
Figure 8:
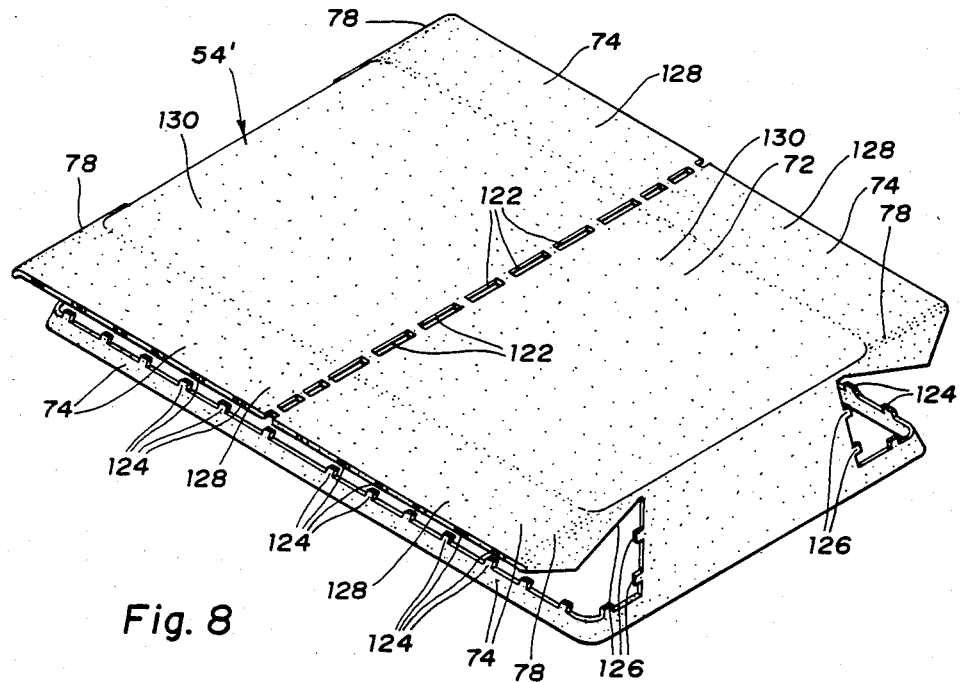
FIG. 8 is a view of the container of FIG. 7 with the one set of flaps opened to permit initial deployment of the cushion, not shown, along alternate paths parallel to the driver's torso.
Figure 9:
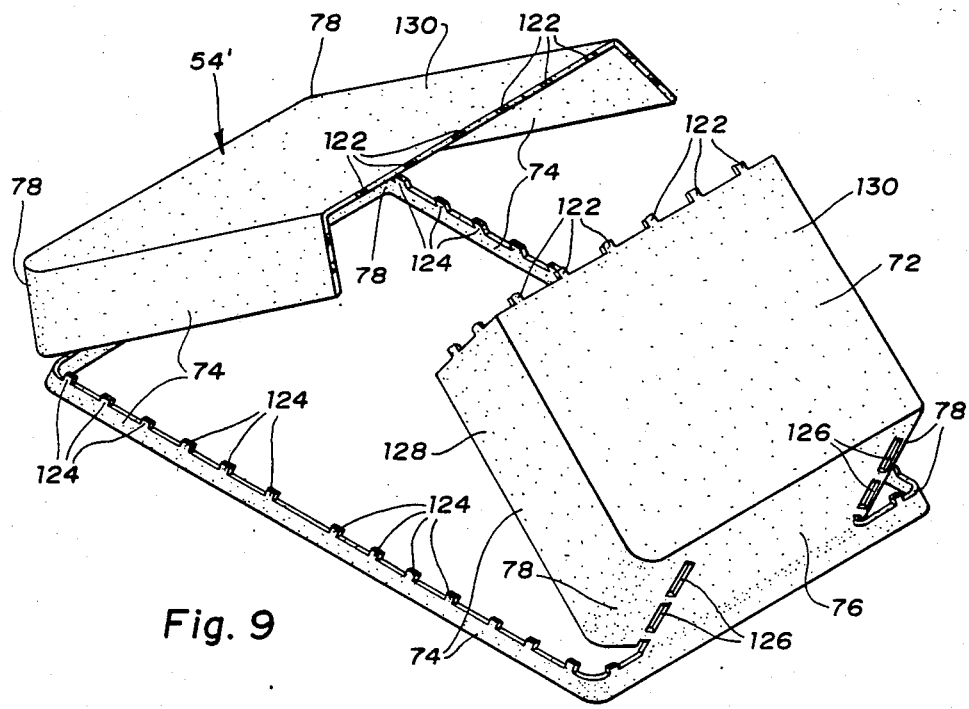
FIG. 9 is a view of the container of FIG. 7 with the other set of flaps opened to permit deployment of the cushion, not shown, along the normal or intended path toward the driver's torso.

Referring now to FIGS. 7, 8, and 9, a second embodiment of the invention will be described. The container 54' of this embodiment differs from that of the first embodiment in the location and extent of the lines of perforations. Therefore, like numerals are used for like parts. As shown in FIG. 7, a line of perforations 122 traverses the base wall 72 and the side walls 74 of the container 54' and terminates short of the lower or free edge portions of the side walls 74. A line of perforations 124 extends longitudinally of each side wall 74 and terminates in the side walls 76 adjacent the corners 78. Each line of perforations 124 is joined to the end of a line of perforations 122. A pair of lines of perforations 126 in each side wall 76 extends from the ends of the lines of perforations 124 to adjacent the upper or juncture edge portions of the side walls 76.

It will be understood that the cover 60', not shown, has lines which are generally aligned with the lines of perforations 122, 124, and 126 in the same manner as the lines 90, 92 and 96 of the cover 60 are generally aligned with the lines of perforations 80, 82, and 84.

The lines of perforations 124 and 126 define a first pair of flaps 128 which correspond to the first pair of flaps 86 of the container 54'. The flaps 128 are integrally hinged to the container 54' about hinge axes or hinge lines which extend between the upper ends of the lines of perforations 126, as shown in FIG. 8. The first pair of flaps 128 will be moved from their closed position shown in FIG. 7 to their open position shown in FIG. 8 during initial deployment of the cushion, in the same manner as previously explained in conjunction with the flaps 86 of the first embodiment. The first pair of flaps 128 move outwardly and upwardly of the container 54' to open position. Although not shown, it will be understood that the cover 60' includes lines generally aligned with the lines of perforations 122, 124, and 126. The cover 60' will subdivide along its lines to provide flaps, corresponding to the flaps 100 of the cover 60, which are generally coextensive with the flaps 128 and which move generally simultaneously with the flaps 128 to open position to permit deployment of the cushion 42 through the resultant openings generally laterally of the module 20 or parallel to the driver's torso.

The lines of perforations 122 and 124 define a second pair of flaps 130 which correspond in function and operation to the second pair of flaps 88 of the first embodiment. Flaps 130 move from their closed position shown in FIG. 7 to their open position shown in FIG. 9 during normal deployment of the cushion 42, as previously explained in conjunction with flaps 88. Although the cover 60' is not shown, it will be understood that the lines thereof provide flaps generally coextensive with the flaps 130 during normal deployment of the cushion 42. The hinge axes or hinge lines of flaps 86 are generally coplanar with pairs of lines of perforations 126, while the hinge lines of flaps 130 are generally coplanar with lines of perforations 124.

Figure 10:
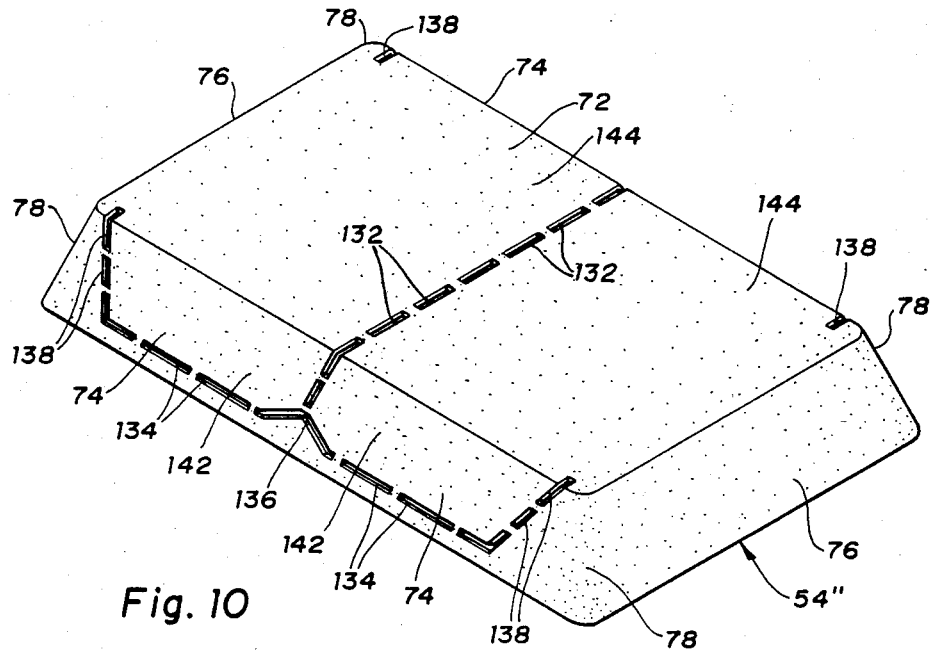
FIG. 10 is a perspective view of a container according to a third embodiment of this invention.
Figure 11:
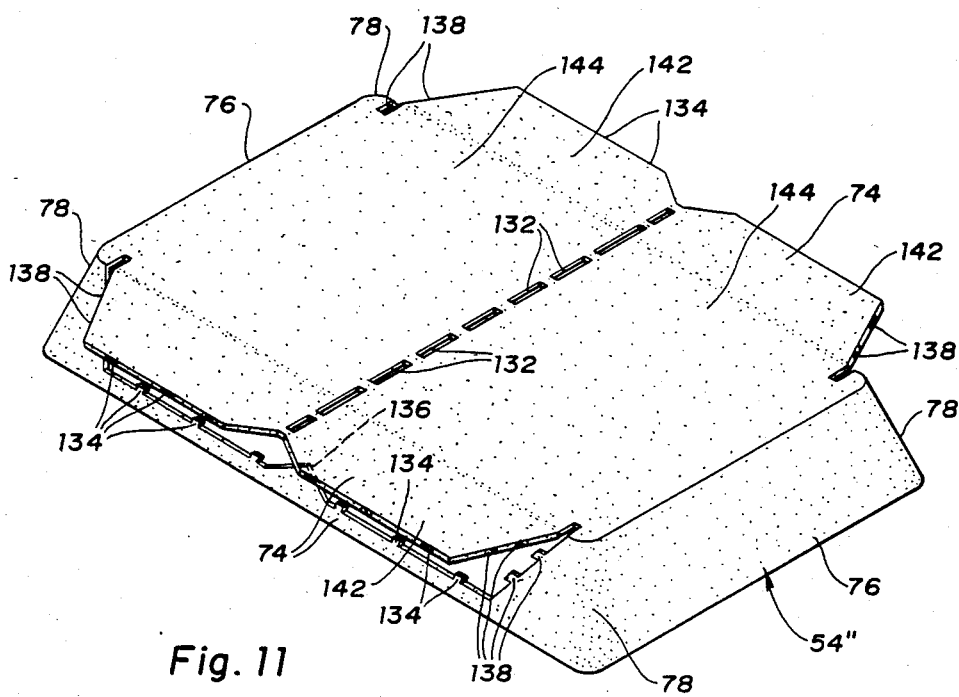
FIG. 11 is a view of the container of FIG. 10 with the one set of flaps opened to permit initial deployment of the cushion, not shown, along alternate paths parallel to the driver's torso.
Figure 12:
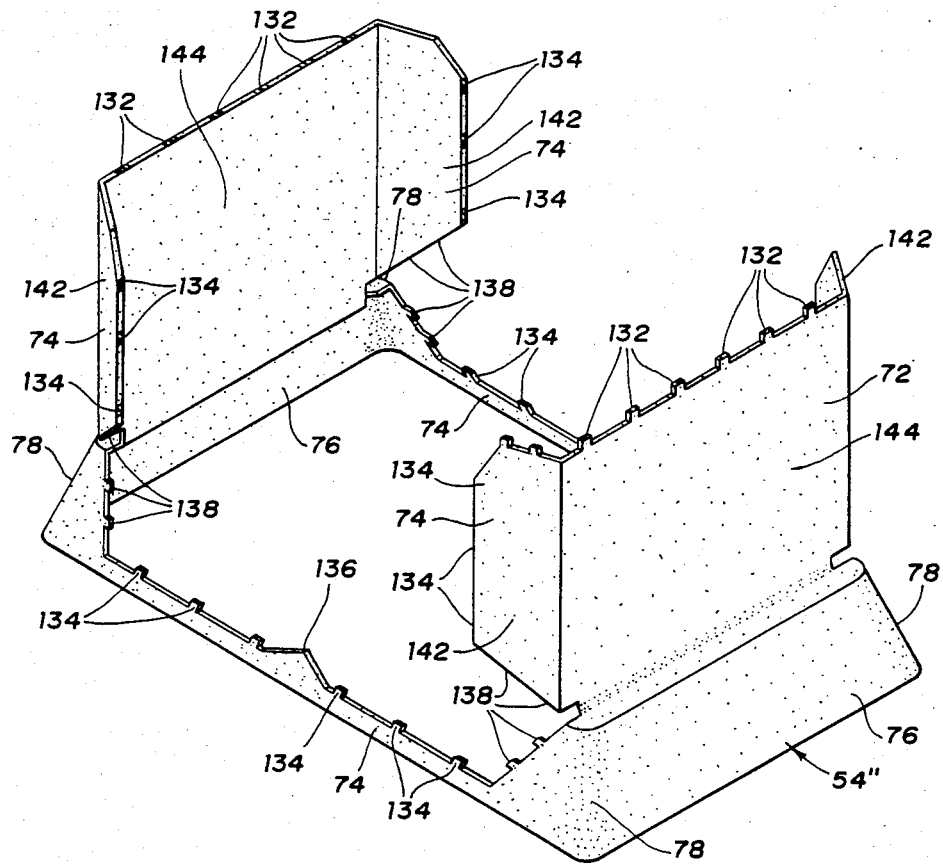
FIG. 12 is a view of the container of FIG. 10 with the other set of flaps opened to permit normal deployment of the cushion, not shown, along the normal or intended path toward the driver's torso.

FIGS. 10, 11, and 12 show a third embodiment 54" of the container. This embodiment differs from the first and second embodiments in its lines of perforations which provide the first and second pairs of flaps. The container 54" includes a line of perforations 132 which traverse the base wall 72 of the container 54" and partially traverse each of the side walls 74 of the container. A line of perforations 134 is provided in each of the side walls 74 adjacent the lower or rearward edge portion thereof, with this line of perforation including an angular central portion, the apex 136 of which is joined to one end of the line of perforations 132. The ends of each line of perforations 134 are joined to the lower or rearward ends of lines of perforations 138 which extend angularly opposite to the corners 78 and across the juncture edge portions of base wall 72 to a terminus slightly within the base wall.

It will be understood that a cover 60" is provided with the container 54" and that the cover 60" has lines which are generally aligned with the lines of perforations 132, 134, and 138 and correspond to the lines 90, 92, and 96 of cover 60.

The lines of perforations 134 and 138 define a first pair of flaps 142, FIG. 10, which correspond in function and operation to flaps 86. Flaps 142 move outwardly and upwardly of the module 20 to their open position shown in FIG. 11 to permit deployment of the cushion 42 along the alternate paths laterally of the module 20 and parallel to the driver's torso as explained in conjunction with the flaps 86 of the first embodiment. The coextensive flaps of cover 60", not shown, open with the flaps 142.

The lines of perforations 132, 134, and 138 define a second pair of flaps 144 which correspond in function and operation to flaps 88. Flaps 144 move from their closed position shown in FIG. 10, to their open position shown in FIG. 12 during deployment of the cushion 42 forwardly of the module 20 along the normal or intended path of deployment. The coextensive flaps of the cover 60", not shown will likewise move with the flaps 144. The hinge lines or hinge axes of flaps 142 and 144 extend between the ends of the perforations 138. The hinge lines of flaps 142 are generally parallel to the upper edge portions of side walls 74, while those of flaps 144 are generally parallel to the upper edge portions of side walls 76, both sets of hinge lines being parallel to the juncture edge portions of base wall 72.

Each apex 136 facilitates the opening of either the line of perforations 132 or the respective lines of perforations 134 once one of such line of perforations is opened. It will also be noted that the lines of perforations 138 are at an angle greater than 90 degrees to the lines of perforations 134. This facilitates the opening of either the lines of perforations 134 or 138 once one of such lines of perforations are opened.

From the foregoing description, it is believed apparent that each embodiment of this invention includes a container having lines of perforations which are separable to provide first and second pairs of flaps during deployment of the folded cushion 42. The first pair of flaps provides alternate paths of initial deployment of the cushion parallel to the driver's torso should the second pair of flaps be unable to open to permit deployment of the cushion along the normal or intended path toward the driver's torso. The cover overlying the container has lines of weakness which are separable generally simultaneously with the lines of perforations to provide cover flaps which are generally coextensive with those of the container. The force against the first pairs of container and cover flaps is provided by the unfolding engagement of the fan folded chordal portions 108, 112, and 116 of the cushion against the container walls 74. The openings resulting from movement of the first pairs of container and cover flaps to open position permit the fan folded chordal portions of the cushion to unfold along the alternate paths of deployment into continuations of the diametrical portions 118 and 120 of the cushion members 44 and 46, generally laterally of the module and generally parallel to the driver's torso. The second pairs of container and cover flaps are moved to open position by the force of the diametrical portion 118 of the cushion member 44 against the base wall 72 of the container to permit the cushion 42 to unfold along the normal or intended path of deployment toward thee driver's torso.

Thus, this invention provides a modular occupant restraint system which permits initial deployment of the cushion along alternate paths of deployment generally parallel to the driver's torso should the cushion be unable to deploy along its intended path toward the driver's torso.

The embodiments of the invention in which an exclusive property or privilege is claimed are defined as follows:

1. A modular occupant restraint system for a vehicle occupant comprising, in combination, a box-like container including a base wall, first and second pairs of spaced side walls joined to the base wall and to each other, a folded inflatable occupant restraint cushion within the container, the cushion being folded to provide a first cushion portion opposite the base wall of the container and second cushion portions, each second cushion portion being located opposite a respective one of the first pair of side walls of the container, means in the walls of the container defining integrally hinged first and second pairs of flaps forcibly separable from the container for movement between a normally closed position and an open position upon inflation and deployment of the cushion, the first pair of flaps being located substantially entirely within the first pair of side walls of the container and being forcibly separated from the container and moved to open position by expansion of the second portions of the cushion to provide alternate paths of deployment of the cushion through the side walls of the container generally parallel to the occupant during initial inflation and deployment of the cushion, the second pair of flaps being located substantially entirely within the base wall of the container and being separated from the container and moved to open position by the first portion of the cushion to permit deployment of the cushion along the intended path through the base wall of the container toward the occupant.

2. A modular occupant restraint system for a vehicle occupant comprising, in combination, a generally rectangularly shaped box-like container including a generally rectangularly shaped base wall, first and second pairs of spaced side walls joined to the base wall and to each other, the side walls of the first pair being located along the longer side edge portions of the base wall and the side walls of the second pair being located along the shorter side edge portions of the base wall, a folded inflatable occupant restraint cushion within the container, the cushion being folded to provide a first cushion portion opposite the base wall of the container and second cushion portions, each second cushion portion being located opposite one side wall of the first pair, integral separable means in the walls of the container defining integrally hinged first and second pairs of flaps forcibly separable from the container for movement between a normally closed position and an open position upon inflation and deployment of the cushion, the first pair of flaps being located substantially within the side walls of the first pair and being forcibly opened by the expansion of the second portions of the cushion to provide alternate paths of deployment of the cushion through the side walls of the container generally parallel to the occupant, the flaps of the second pair being located substantially within the base wall of the container and being forcibly opened by the first portion of the cushion to provide an intended path of deployment through the base wall of the container toward the occupant.

3. A modular occupant restraint system for a vehicle occupant comprising, in combination, a generally rectangularly shaped box-like container including a generally rectangularly shaped base wall, first and second pairs of spaced side walls integrally joined to the base wall and to each other, a folded generally circular inflatable occupant restraint cushion within the container, the cushion being folded to provide a diametrical portion opposite the base wall of the container and fan folded chordal portions providing continuations of the diametrical portion when unfolded and located opposite the first pair of side walls of the container, forcibly separable means in the walls of the container defining integrally hinged first and second pairs of flaps forcibly separable from the container for movement between a normally closed position and an open position upon inflation and deployment of the cushion, the first pair of flaps being located substantially entirely within the first pair of side walls of the container and being forcibly opened by the expansion of the fan folded chordal portions of the cushion, the second pair of flaps being substantially entirely located within the base wall of the container and being forcibly opened by the diametrical portion of the cushion.

4. A modular occupant restraint system for a vehicle occupant comprising, in combination, a generally rectangularly shaped box-like container including a generally rectangularly shaped base wall, first and second pairs of spaced side walls integrally joined to the base wall and to each other, a folded generally circular inflatable occupant restraint cushion within the container, the cushion being folded to provide a diametrical portion opposite the base wall of the container and fan folded chordal portions providing continuations of the diametrical portion when unfolded and located opposite the first pair of side walls of the container, lines of perforations in the walls of the container defining integrally hinged first and second pairs of flaps forcibly separable from the container for movement between a normally closed position and an open position upon inflation and deployment of the cushion, the first pair of flaps being located substantially entirely within the first pair of side walls of the container and being forcibly opened by the expansion of the fan folded chordal portions of the cushion, the second pair of flaps being substantially entirely located within the base wall of the container and being forcibly opened by the diametrical portion of the cushion.

5. A folded occupant restraint cushion, comprising, in combination, first and second cushion members of generally circular shape and of the same general extent, means securing the circular edge portions of the cushion members to each other, the first and second cushion members having overlying diametrical portions of the same general extent between the edge portions thereof, the chordal portion of the cushion members to each side of the diametrical portions being fan folded and located within the diametrical portions, the terminal radial portion at each end of the diametrical portion being folded after the chordal portions are fan folded and located within the diametrical portions to provide a folded cushion of minimum size for storage within a housing, the folded chordal portions between the folded terminal radial portions being capable of radially unfolding upon initial inflation of the folded cushion to reduce internal cushion pressure against the diametrical portion of the first cushion member during such initial inflation of the folded cushion.

6. A folded occupant restraint cushion, comprising, in combination, first and second juxtaposed cushion members of generally circular shape and of the same general extent, means securing the circular edge portions of the cushion members to each other to provide the restraint cushion, the first cushion member providing an impact surface for a vehicle occupant when the cushion is inflated from a source of pressure fluid through an inlet provided in the second cushion member, the first and second cushion members having overlying diametrical portions of the same general extent between the edge portions thereof, the inlet in the second cushion member being provided in the diametrical portion thereof, the chordal portion of the cushion members to each side of the diametrical portions being fan folded and located within the diametrical portions, the terminal radial portion at each end of the diametrical portion being folded after the chordal portions are fan folded and located within the diametrical portions to provide a folded cushion of minimum size, the folded chordal portions between the folded terminal radial portions being capable of radially unfolding when the folded cushion is initially inflated by the pressure fluid to reduce internal pressure against the diametrical portion of the first cushion member during such initial inflation.

7. A container for housing a folded inflatable occupant restraint cushion comprising, in combination, a box-like housing including a base wall, first and second pairs of spaced side walls joined to each other and to the base wall, a generally U-shaped line of perforations located substantially within each side wall of one pair and defining a forcibly separable flap movable from a closed position to open position about a hinge line through the legs of the U-shaped line of perforations, and a generally linear line of perforations located substantially within the base wall of the housing and connecting the bases of the U-shaped lines of perforations, the linear line of perforations and the bases of the U-shaped lines defining forcibly separable flaps movable from a closed position to open position about hinge lines through the ends of the bases of the U-shaped lines of perforations.

8. A module occupant restrain system for a vehicle occupant comprising, in combination, a box-like container including a base wall and spaced side walls joined to the base wall and to each other, a folded inflatable occupant restraint cushion within the container, the cushion being folded to provide a first cushion portion opposite the base wall of the container and second cushion portions, each second cushion portion being located opposite a respective side wall of the container, separable means in the walls of the container defining integrally hinged first and second pairs of forcibly separable flaps, the first pair of flaps being forcibly separable from the container and moved to open position by the first portion of the cushion upon inflation of the cushion to permit deployment of the cushion along an intended path outwardly of the base wall of the container and toward the occupant the second pair of flaps being forcibly separable from the container and moved to open position by the second portions of the cushion upon inflation of the cushion to permit deployment of the cushion along alternate paths outwardly of the side walls of the container and generally parallel to the occupant.

9. The combination recited in claim 8 wherein the separable means includes a generally H-shaped tear line, the bight of the tear line being located in the base wall of the container between the junctures of the base wall and the spaced side walls, and the legs of the tear line extending generally parallel to and adjacent to such junctures of the base wall and spaced side walls.

* * * * *